United States Patent [19]
Sheridan et al.

[11] Patent Number: 5,335,968
[45] Date of Patent: Aug. 9, 1994

[54] CHILD'S BOOSTER SEAT

[76] Inventors: Peter A. J. Sheridan; Helen J. Sheridan, both of 10 Gordon Drive, East Boldon, Tyne & Wear NE36 0TD, England

[21] Appl. No.: 962,115

[22] Filed: Oct. 16, 1992

[30] Foreign Application Priority Data

Oct. 16, 1991 [GB] United Kingdom ............. 9121918

[51] Int. Cl.⁵ ................................. A47C 1/11
[52] U.S. Cl. ............................ 297/250,1; 297/254; 297/255; 297/DIG. 3; 5/654
[58] Field of Search ............. 5/653, 654; 297/250.1, 297/254, 255, 952.41, DIG. 3

[56] References Cited

U.S. PATENT DOCUMENTS

| | | | |
|---|---|---|---|
| 2,938,570 | 5/1960 | Flajole | 297/DIG. 3 X |
| 3,265,438 | 8/1966 | Regan et al. | 297/250.1 X |
| 3,712,674 | 1/1973 | Ando | 297/DIG. 3 X |
| 4,836,605 | 6/1989 | Greenwood et al. | 297/250.1 |
| 5,005,902 | 4/1991 | Farnworth et al. | 297/DIG. 3 X |

Primary Examiner—Michael F. Treitel
Attorney, Agent, or Firm—Cushman, Darby & Cushman

[57] ABSTRACT

A child's booster seat comprises an inflatable seat member having a primary base chamber, two opposed side chambers and a back chamber upstanding from the base chamber. An inflatable secondary base chamber is located below the primary base chamber to support the seat member thereon, the secondary base chamber being selectively inflatable to determine the height of the seat member relative thereto, restraining means being provided for retaining a child in the seat member, and securing means being provided for attaching the booster seat to a supporting chair.

4 Claims, 3 Drawing Sheets

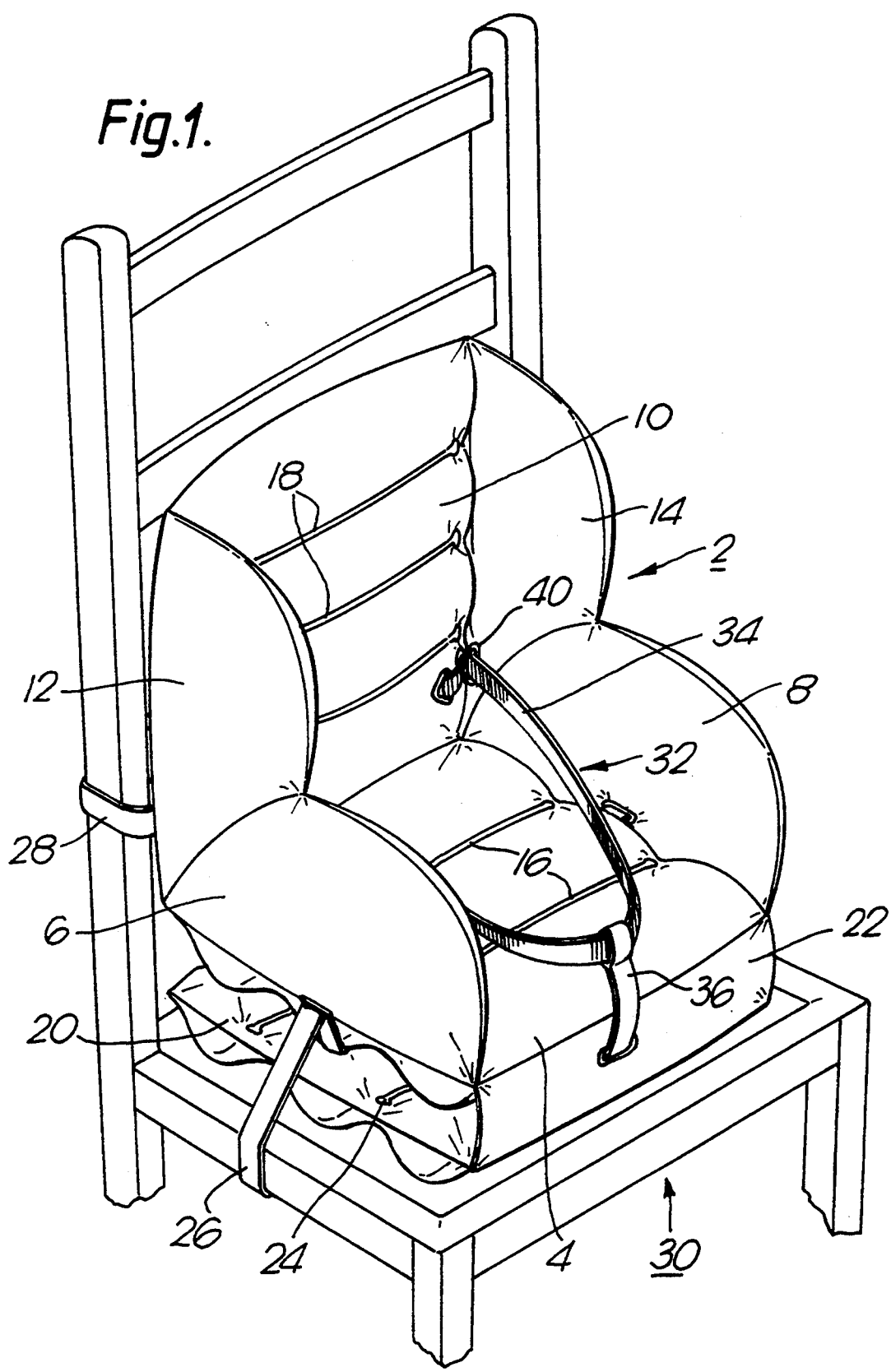

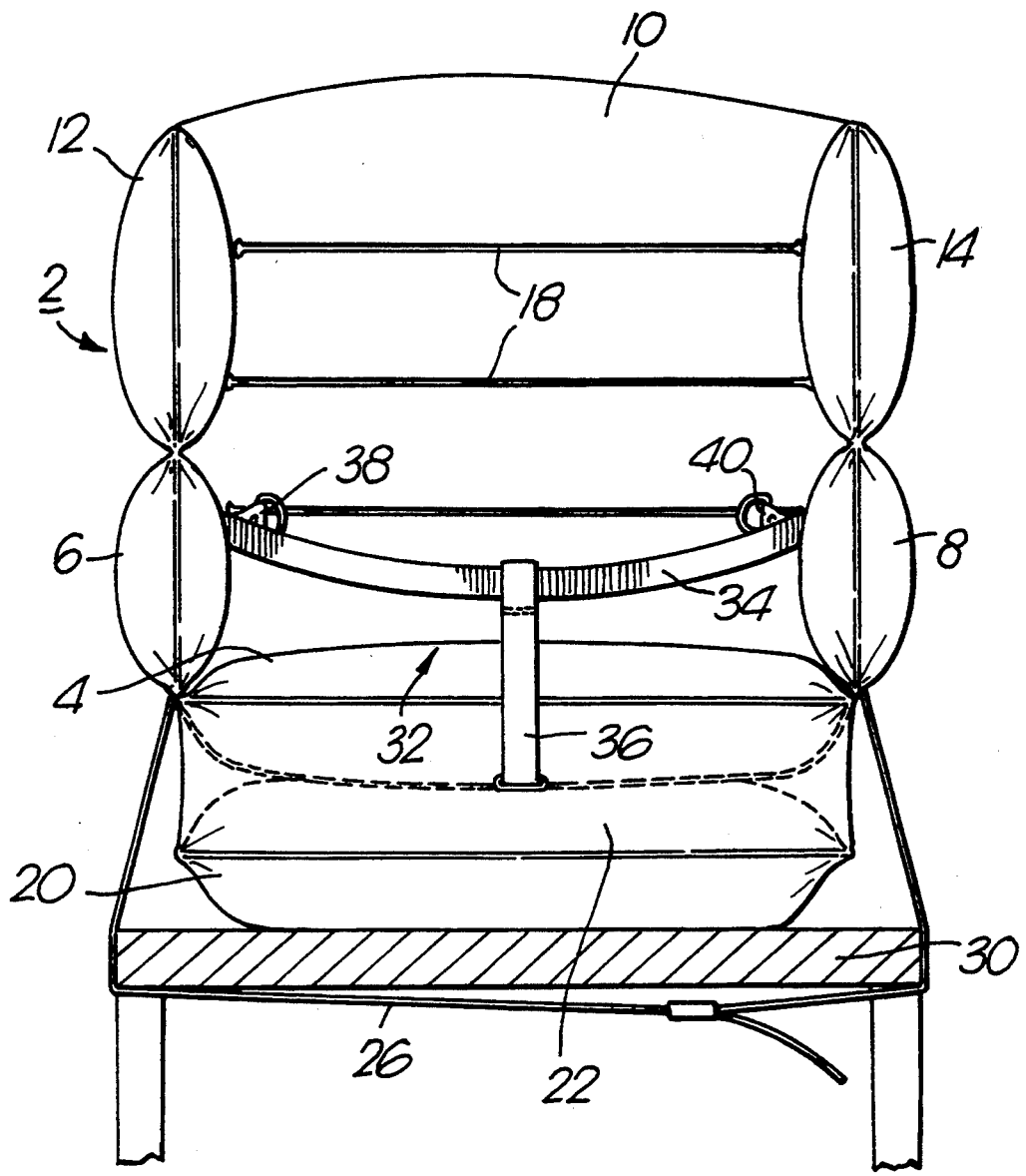

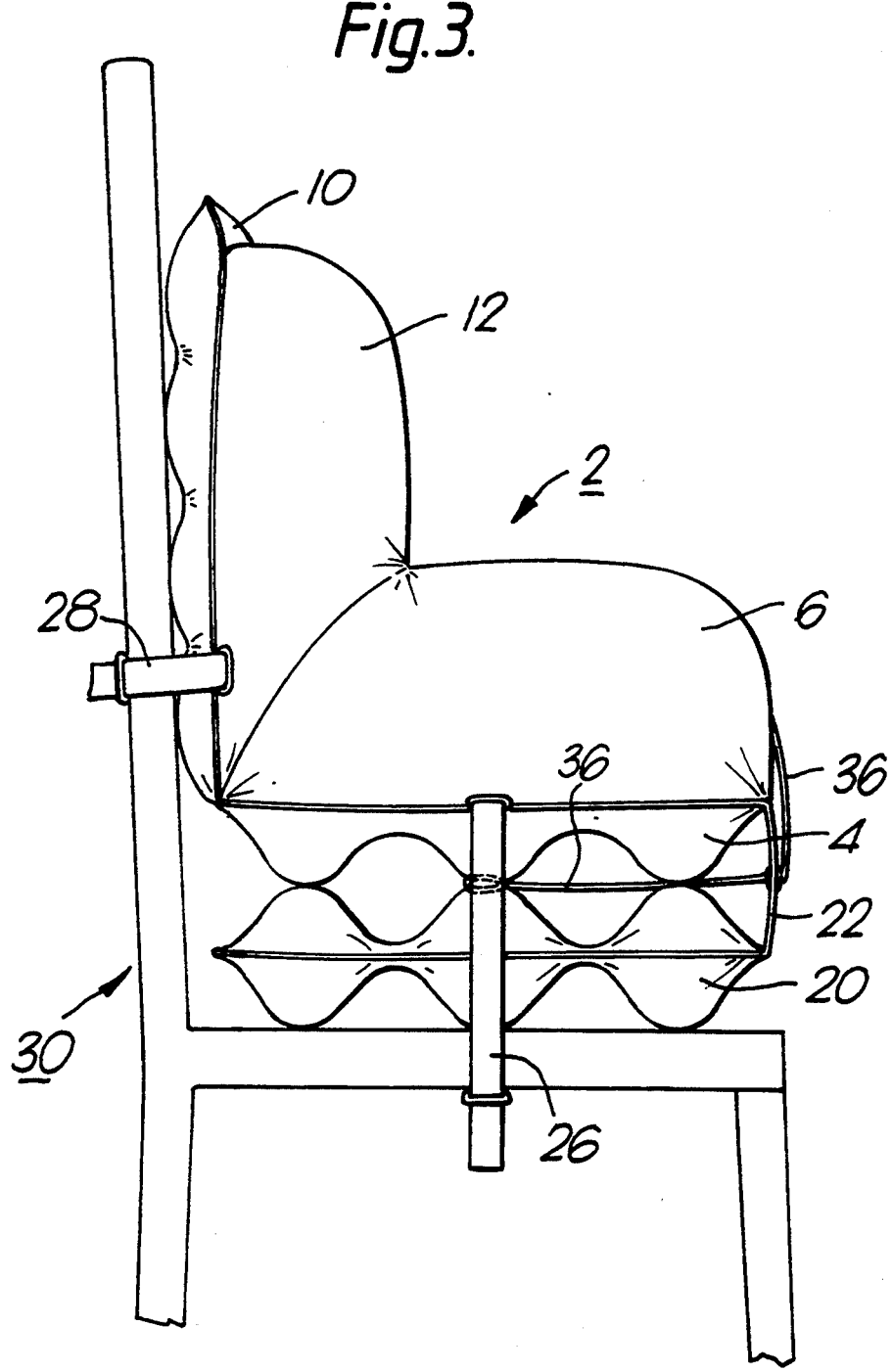

CHILD'S BOOSTER SEAT

BACKGROUND OF THE INVENTION

This invention relates to children's booster seats, and in particular to inflatable booster seats.

Booster seats are commonly used in a variety of situations to raise a child to a convenient level using existing seating arrangements. For example, placed on the seat of a dining chair, a booster seat enables a child to sit at a table and join the family in a meal without the necessity of using a high chair.

Furthermore, the use of a booster seat in a motor vehicle raises the child to a height whereby the conventional seat belts can be used to restrain the child in the vehicle, and whereby the child can see out of the vehicle.

However, most current designs of booster seats are commonly made of plastic or wood and are therefore relatively heavy and bulky. They are usually of a fixed height and are often not provided with means for securing either the child in the seat or the seat itself to the associated chair. Additionally many current designs of booster seat do not provide adequate support for the child, in that they lack side supports.

U.S. Pat. No. 4,836,605 proposes an inflatable booster seat including upper and lower portions hinged together to provide a seat for the child. However, the seat, once inflated, is of a fixed configuration which does not provide adequate support for the child sufficient to ensure that he is safely secured therein.

SUMMARY OF THE INVENTION

It is an object of the invention to provide a booster seat which ensures comfortable and positive support of a child therein, and the height of which can be varied to enable application thereof to a variety of different situations for children of different heights.

According to the present invention there is provided a booster seat comprising an inflatable seat member including a primary base chamber, a back chamber upstanding from the rear of said primary base chamber, and a pair of opposed side chambers upstanding one from each side of said primary base chamber, the booster seat further comprising an inflatable secondary base chamber located below, to support thereon, said primary base chamber, said secondary base chamber being selectively inflatable to determine the height of the seat member relative thereto, means for restraining a child seated in the seat member, and means for securing the booster seat to a supporting chair.

It will be appreciated that the provision of the secondary base chamber, which can be inflated to any degree between empty and fully inflated, enables the seat member, and in particular the primary base chamber thereof, to be located at any one of a variety of different levels whereby a user can, within predetermined limits, be located at an optimum height relative to the supporting chair regardless of the size of the user and to accommodate different heights of tables, car seat belts and the like.

Furthermore, the provision of the side chambers supports the user within the seat member and prevents inadvertent sideways movement of the user as could otherwise occur particularly with younger children.

Although the chambers of the seat member may be inflatable separately from one another, it is preferred that the back chamber comprises an independent chamber and that the primary base chamber and opposed side chambers are interconnected with one another to be inflatable as a unit.

Preferably the seat member includes a pair of opposed chambers one to each side thereof and extending the height of the back chamber to provide further lateral support for a user. Conveniently said side chambers are each interconnected with the back chamber whereby the back chamber and said side chambers are inflatable as a unit.

The primary and secondary base chambers may be formed integrally with one another, a hinge region extending transversely of the seat between the front edges of said primary and secondary base chambers whereby the latter chamber can be pivoted about said hinge region to a position underlying the former chamber.

Alternatively the primary and secondary chambers may be releasably attached to one another, for example by means of a plurality of releasable fastenings such as press-studs or the like provided along the front edges of the two chambers.

BRIEF DESCRIPTION OF THE DRAWINGS

FIG. 1 shows a booster seat according to the invention located on a supporting chair, and FIGS. 2 and 3 are a front view and a side view respectively of the seat of FIG. 1.

DESCRIPTION OF THE PREFERRED EMBODIMENT

Referring to the drawings, the illustrated booster seat comprises an inflatable seat member indicated generally at 2 and including a primary base chamber 4, a pair of opposed side chambers 6,8 upstanding one from each side of the base chamber 4, a back chamber 10 upstanding from the rear of the base chamber 4, and a further pair of opposed side chamber 12,14 extending the height of the back chamber 10 and projecting forwardly one from each side of the back chamber.

The base chamber 4 and the two side chambers 6,8 are separated by welds but communicate with one another to be inflatable as a first unit, while the back chamber 10 and the two side chambers 12,14 are also separated by welds but similarly communicate with one another to be inflatable as a second unit. Said first and second units of the seat member are integral with one another and are manufactured from two sheets of plastic welded together around the edges to form the front and rear surfaces of the seat member. Conveniently the front plastic sheet is provided with a flock finish thereto while the rear sheet has a smooth finish.

The base chamber 4 and the back chamber 10 each incorporate transverse welds 16,18 respectively between the front and rear surfaces thereof to stiffen the associated chambers.

An inflatable secondary base chamber 20 underlies the primary base chamber 4, the front edges of the two base chambers 4,20 being interconnected by means of a transverse hinge 22 extending the width of the seat member 2 whereby the secondary base chamber 20 can be pivoted about said hinge 22 relative to the primary base chamber 4 from an inoperative position extending forwardly from, to form a continuation of, the primary base chamber 4 to the illustrated operative position underlying the primary base chamber 4.

The secondary base chamber 20 incorporates transverse welds 24 for strengthening purposes, and, in the illustrated embodiment, is integrally formed with the seat member 2, the two sheets of plastic comprising the seat member being extended to form a laminated hinge 22 and the opposed surfaces of the secondary base chamber 20.

The booster seat incorporates a lower securing strap 26 extending transversely of the seat member 2 below the primary base chamber 4 thereof and extending through slots in the welds between the primary base chamber 4 and the side chambers 6,8, and a rear securing strap 28 extending transversely of the back chamber 10 and passing through slots in the welds between the back chamber 10 and the side chambers 12,14. The straps 26,28 enable the booster seat to be secured to a supporting chair indicated generally at 30.

The booster seat further incorporates a harness indicated generally at 32 and including a waist strap 34 and a crotch strap 36, the waist strap 34 conveniently extending between opposed anchorage points 38,40 one to each side of the back chamber 10, and the free end of the crotch strap 36 being secured to the lower securing strap 26.

In use, the seat member 2 and secondary base chamber 20 are inflated, the secondary base chamber 20 is hinged to its operative position below the primary base chamber 4, and the booster seat is located on the associated chair 30. The straps 26 and 28 are passed around the seat and the back respectively of the chair 30, and the child is located in the harness 32 to seat on the primary base chamber 4.

Dependent upon the desired level of the primary base chamber 4, the secondary base chamber 20 can be selectively deflated and inflated until the child is at a chosen height relative to the table or other adjacent article.

It will be appreciated that the construction of the seat member 2 is such as to provide excellent lateral support for both the body and the head of the child, while the provision of the inflatable secondary base chamber permits a degree of adjustability to the location of the seat member which enables the child to adopt a comfortable position relative to the chair 30.

The hinged connection between the primary and secondary base chambers 4,20 may be other than permanent, and may be of a releasable nature, for example by comprising a plurality of releasable fastenings such as press-studs or the like provided along the front edges of the two chambers 4,20.

As well as the domestic application illustrated in the drawings, the described booster seat may be located on the rear seat of a motor vehicle, the height adjustability provided by the secondary base chamber 20 being such as to enable the booster seat to be positioned whereby the standard seat belts can be used to retain the child in conventional manner with the child high enough to be able to see out the vehicle.

Other applications will be apparent to those skilled in the art, as will be various modifications that can be made to the described and illustrated seat without departing from the scope of the invention.

What we claim and desire to secure by Letters Patent is:

1. A booster seat comprising:
an inflatable seat member including a primary base chamber, a back chamber comprising an independent chamber upstanding from the rear of said primary base chamber, a pair of opposed side chambers upstanding one from each side of said primary base chamber and which are interconnected with said primary base chamber to be inflatable as a unit, an inflatable secondary base chamber located below, to support thereon, said primary base chamber, said secondary base chamber being selectively inflatable to determine the height of the seat member relative thereto;
means for restraining a child seated in the seat member; and
means for securing the booster seat to a supporting chair.

2. A booster seat comprising:
an inflatable seat member including a primary base chamber, a back chamber upstanding from the rear of said primary base chamber, a pair of opposed side chambers upstanding one from each side of said primary base chamber, a pair of opposed chambers one to each side of the back chamber and extending the height of the back chamber, an inflatable secondary base chamber located below, to support thereon, said primary base chamber, said secondary base chamber being selectively inflatable to determine the height of the seat member relative thereto;
means for restraining a child seated in the seat member; and
means for securing the booster seat to a supporting chair.

3. A booster seat as claimed in claim 2 in which the opposed chambers are each interconnected with the back chamber whereby the back chamber and said side chambers are inflatable as a unit.

4. A booster seat comprising:
an inflatable seat member including a primary base chamber, a back chamber upstanding from the rear of said primary base chamber, a pair of opposed side chambers upstanding one from each side of said primary base chamber, an inflatable secondary base chamber located below, to support thereon, said primary base chamber, said secondary base chamber being selectively inflatable to determine the height of the seat member relative thereto;
means for restraining a child seated in the seat member; and
means for securing the booster seat to a supporting chair, wherein said primary base chamber and the secondary base chamber are formed integrally with one another, a hinge region extending transversely of the seat between the front edges of said primary base chamber and secondary base chamber whereby the second base chamber can be pivoted about said hinge region to a position underlying the primary base chamber.

* * * * *